United States Patent
Woodruff et al.

(10) Patent No.: US 12,063,295 B2
(45) Date of Patent: Aug. 13, 2024

(54) PROVISIONING CONTROL APPARATUS AND METHOD FOR PROVISIONING ELECTRONIC COMPONENTS FOR ELECTRONIC DEVICES

(71) Applicant: Secure Thingz Ltd., Cambridge (GB)

(72) Inventors: Tim Woodruff, Cambridge (GB); Peter Dunne, Huntingdon (GB); Andrew Bott, Cambridge (GB)

(73) Assignee: SECURE THINGZ LTD., Cambridge (GB)

( * ) Notice: Subject to any disclaimer, the term of this patent is extended or adjusted under 35 U.S.C. 154(b) by 0 days.

(21) Appl. No.: 17/696,057

(22) Filed: Mar. 16, 2022

(65) Prior Publication Data
US 2022/0303119 A1    Sep. 22, 2022

(30) Foreign Application Priority Data

Mar. 17, 2021 (EP) ..................................... 21163100

(51) Int. Cl.
   *H04L 9/08* (2006.01)
(52) U.S. Cl.
   CPC ............ *H04L 9/083* (2013.01); *H04L 9/0897* (2013.01)
(58) Field of Classification Search
   USPC ........................................................ 380/279
   See application file for complete search history.

(56) References Cited

U.S. PATENT DOCUMENTS

| | | |
|---|---|---|
| 8,213,618 B2 | 7/2012 | Dewan |
| 9,479,328 B1 | 10/2016 | Wilburn et al. |
| 9,674,162 B1 | 6/2017 | Miller et al. |

(Continued)

FOREIGN PATENT DOCUMENTS

| | | |
|---|---|---|
| CN | 210136494 U | 3/2020 |
| TW | 201800996 A | 1/2018 |

OTHER PUBLICATIONS

Office Action from Taiwanese Application No. 111108909, Nov. 30, 2022.

(Continued)

*Primary Examiner* — Sakinah White Taylor
(74) *Attorney, Agent, or Firm* — Workman Nydegger (57) ABSTRACT

A provisioning control apparatus coupled to a provisioning equipment server electrically connectable with electronic components each including a security enclave and a non-volatile memory. The provisioning control apparatus includes a processor configured to encrypt the security sensitive provisioning data using a secure vault encryption key for obtaining encrypted security sensitive provisioning data. The provisioning control apparatus has a communication interface configured to securely provide the secure vault encryption key to the provisioning equipment server for storing the secure vault encryption key in the security enclave of the electronic component. The communication interface is further configured to provide the encrypted security sensitive provisioning data to the provisioning equipment server for storing the encrypted security sensitive provisioning data in the non-volatile memory of the electronic component and thereby creating a secure vault in the non-volatile memory of the electronic component for securely storing the encrypted security sensitive provisioning data.

12 Claims, 4 Drawing Sheets

(56) References Cited

U.S. PATENT DOCUMENTS

| | | |
|---|---|---|
| 2013/0046981 A1 | 2/2013 | Ducharme et al. |
| 2019/0097818 A1* | 3/2019 | Lu .................. H04L 9/3263 |
| 2019/0332815 A1 | 10/2019 | Kamhiski et al. |
| 2021/0034791 A1* | 2/2021 | Singh .............. G06F 21/6218 |

OTHER PUBLICATIONS

Extended Search Report from corresponding EP Application No. EP21163100.7, mailed Aug. 18, 2021.

* cited by examiner

PROVISIONING CONTROL APPARATUS AND METHOD FOR PROVISIONING ELECTRONIC COMPONENTS FOR ELECTRONIC DEVICES

TECHNICAL FIELD

The invention relates to the secure production and provisioning of electronic components for electronic devices. More specifically, the invention relates to an apparatus and method for provisioning electronic components of electronic devices.

BACKGROUND OF THE INVENTION

The production and assembly of state-of-the-art electronic devices, such as smartphones, tablet computers as well as other types of electronic consumer devices or IoT devices, often happens in a distributed fashion in that the various electronic components, including the electronic chips or microprocessors of an electronic consumer device are manufactured, provisioned or personalized and finally assembled at different locations and by different parties. For instance, an electronic chip or microprocessor for an electronic device may be originally manufactured by a chip manufacturer and provisioned by another party with security sensitive provisioning data, such as cryptographic keys and/or a firmware, before being assembled into the final end product by the manufacturer of the electronic device, e.g., an OEM.

Due to cost reasons the electronic components, e.g., chips or microprocessors, of a lot of electronic devices, such as electronic devices for the IoT market, have limited hardware and/or software capabilities, such as a small memory size, a limited computational processing power, as well as other restrictions. However, once in the field, the security of such electronic devices and their electronic components with limited hardware resources is usually still important, for instance, in case of electronic IoT devices operating in consumer homes. Ideally, these electronic devices and their electronic components with limited hardware resources should provide the best security possible, for instance, to abide by the IoT Security Foundation principles.

For increasing the security of electronic components, such as chips or microprocessors, it is known to provide a security enclave thereon. For instance, U.S. Pat. No. 8,832,465 discloses a security enclave processor on a system on a chip, i.e., a security enclave rooted in the hardware that may store, for instance, secret cryptographic keys. However, due to the reasons described above, these security enclaves often have limited hardware resources as well, in particular a limited memory size. Thus, they may be limited in the number of cryptographic keys and the type of cryptographic keys they may store securely. For instance, a security enclave of a chip may support RSA private/public key pairs, but not the latest ECC-type keys which have many advantages over the RSA keys. Or a security enclave of a chip may only be capable of storing a limited number of private keys of a given key size, while a security application running on the chip may require a larger number of keys possibly with a larger key size.

In addition to keys, the security enclave of a chip needs to protect configuration data, for instance settings for registers of the chip that are asserted on power up that determine the behaviour of the chip thereafter. These may control access to parts of memory so that only secure software can access that memory. It is important that this configuration data is not modifiable by application software where a rogue application might be designed to reveal secret keys by changing the start-up configuration. Usually, the security enclave of such hardware limited electronic devices is not sufficient to store the necessary configuration data.

Thus, there is a need for apparatuses and methods for securely provisioning hardware limited electronic components, such as chips or microprocessors, for electronic devices.

SUMMARY OF THE INVENTION

It is therefore an object of the invention to provide apparatuses and methods allowing for securely provisioning hardware limited electronic components or devices, such as chips or microprocessors, for electronic equipment.

The foregoing and other objects are achieved by the subject matter of the independent claims. Further implementation forms are apparent from the dependent claims, the description and the figures.

According to a first aspect of the invention a provisioning control apparatus configured to be coupled to a provisioning equipment server is provided. The provisioning equipment server is electrically connectable with one or more electronic components for provisioning the one or more electronic components with security sensitive provisioning data, wherein each electronic component comprises a hardware security enclave and a non-volatile memory.

The electronic components may comprise chips, microprocessors or other programmable electronic components, such as Flash memories, application processors, memory control units (MCUs), electrically erasable programmable read only memories (EEPROM), programmable logic devices (PLDs), field programmable gate arrays (FPGAs), systems-on-chip (SoC), and microcontrollers incorporating non-volatile memory elements.

The provisioning control apparatus comprises: a processor configured to encrypt the security sensitive provisioning data using a secure vault encryption key for obtaining encrypted security sensitive provisioning data. Moreover, the provisioning control apparatus comprises a communication interface configured to securely provide the secure vault encryption key to the provisioning equipment server for storing the secure vault encryption key in the security enclave of the electronic component. The communication interface is further configured to provide the encrypted security sensitive provisioning data to the provisioning equipment server for storing the encrypted security sensitive provisioning data in the non-volatile memory of the electronic component and thereby creating a secure vault in the non-volatile memory of the electronic component for securely storing the security sensitive provisioning data.

Advantageously, the provisioning control apparatus according to the first aspect makes it possible that electronic components with more basic or limited hardware security enclaves can be used with the same model of key storage, and may hold keys of types that the security enclave is unaware of, as well as significantly more keys than the enclave could hold.

In an embodiment, the processor is further configured to generate the secure vault encryption key.

In an embodiment, the security sensitive provisioning data comprises one or more cryptographic keys, one or more key certificates corresponding to the one or more cryptographic keys and/or data defining one or more security configurations of the electronic component, in particular register settings.

In an embodiment, the security sensitive provisioning data comprises one or more hash values of one or more key certificates. In such an embodiment, the one or more key certificates may be stored in the less secure non-volatile memory of the electronic component. In another embodiment, an application software running on the provisioned electronic component may receive the one or more key certificates over a communication link from a certificate store and compare the respective hash values.

In an embodiment, the non-volatile memory of the electronic component is a Flash memory of the electronic component.

In an embodiment, the secure vault encryption key is a symmetric key.

In an embodiment, the communication interface is further configured to securely provide a secure vault authentication key to the provisioning equipment server for storing the secure vault authentication key in the security enclave and the non-volatile memory of the electronic component. In an embodiment, the secure vault authentication key may be used as part of a cipher suite that includes authentication, such as AES-GCM. In a further embodiment, the secure vault authentication key may be a symmetric key for a MAC, such as HMAC or CMAC, to provide an authentication function on the encrypted security sensitive provisioning data. In a further embodiment, the secure vault authentication key may be part of an asymmetric private/public key pair. In such an embodiment, the signature might be done either by the secure enclave using the private key stored therein, or it might be done outside using a private key stored in the memory of the provisioning control apparatus. In this case, there might also be a certificate chain proving that the authentication is from the OEM's PM (Public Key Infrastructure).

In an embodiment, the secure vault is unique for the electronic component.

In an embodiment, the communication interface is further configured to provide a secure vault API to the provisioning equipment server for storing the program code of the secure vault API in the non-volatile memory of the electronic component, wherein the secure vault API is configured to decrypt the encrypted provisioning data stored in the secure vault based on the secure vault encryption key stored in the security enclave, i.e. to provide access to the secure vault.

In an embodiment, the communication interface is further configured to provide a provisioning application to the provisioning equipment server for executing the provisioning application by the electronic component, wherein the provisioning application is configured to be executed by a processor of the electronic component for establishing a secure communication channel between the provisioning control apparatus and the electronic component and wherein the communication interface is configured to provide the secure vault encryption key via the secure communication channel to the provisioning equipment server for storing the secure vault encryption key in the security enclave of the electronic component.

In a further embodiment, the provisioning application is configured to cause the security enclave to create at least one key pair, including a private key and a public key, and to store the private key in the security enclave. The communication interface of the provisioning control apparatus is configured to receive the public key of the security enclave and its processing circuitry is configured to encrypt at least a portion of the security sensitive provisioning data with the public key of the security enclave. The communication interface of the provisioning control apparatus is further configured to provide the security sensitive provisioning data encrypted with the public key of the security enclave to the provisioning equipment server for storing the security sensitive provisioning data encrypted with the public key of the security enclave in the secure vault in the non-volatile memory of the electronic component.

According to a second aspect a provisioning system is provided, comprising a provisioning control apparatus according to the first aspect and a provisioning equipment server.

According to a third aspect a method is provided for provisioning one or more electronic components with security sensitive provisioning data by a provisioning control apparatus configured to be coupled to a provisioning equipment server. The provisioning equipment server is electrically connectable with the one or more electronic components, wherein each electronic component comprises a hardware security enclave and a non-volatile memory. The provisioning method according to the third aspect comprises:

encrypting the security sensitive provisioning data using a secure vault encryption key for obtaining encrypted security sensitive provisioning data;

securely providing the secure vault encryption key to the provisioning equipment server for storing the secure vault encryption key in the security enclave of the electronic component; and providing the encrypted security sensitive provisioning data to the provisioning equipment server for storing the encrypted security sensitive provisioning data in the non-volatile memory of the electronic component and thereby creating a secure vault in the non-volatile memory of the electronic component for securely storing the security sensitive provisioning data.

The provisioning method according to the third aspect of the invention can be performed by the provisioning control apparatus according to the first aspect of the invention. Further features of the provisioning method according to the third aspect of the invention result directly from the functionality of the provisioning control apparatus according to the first aspect of the invention and its different implementation forms described above and below.

Embodiments of the invention can be implemented in hardware and/or software.

BRIEF DESCRIPTION OF THE DRAWINGS

Further embodiments of the invention will be described with respect to the following figures, wherein.

In the figures, identical reference signs will be used for identical or at least functionally equivalent features.

DETAILED DESCRIPTION OF EMBODIMENTS

In the following detailed description, reference is made to the accompanying drawings, which form part of the disclosure, and in which are shown, by way of illustration, specific aspects in which the present invention may be implemented. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
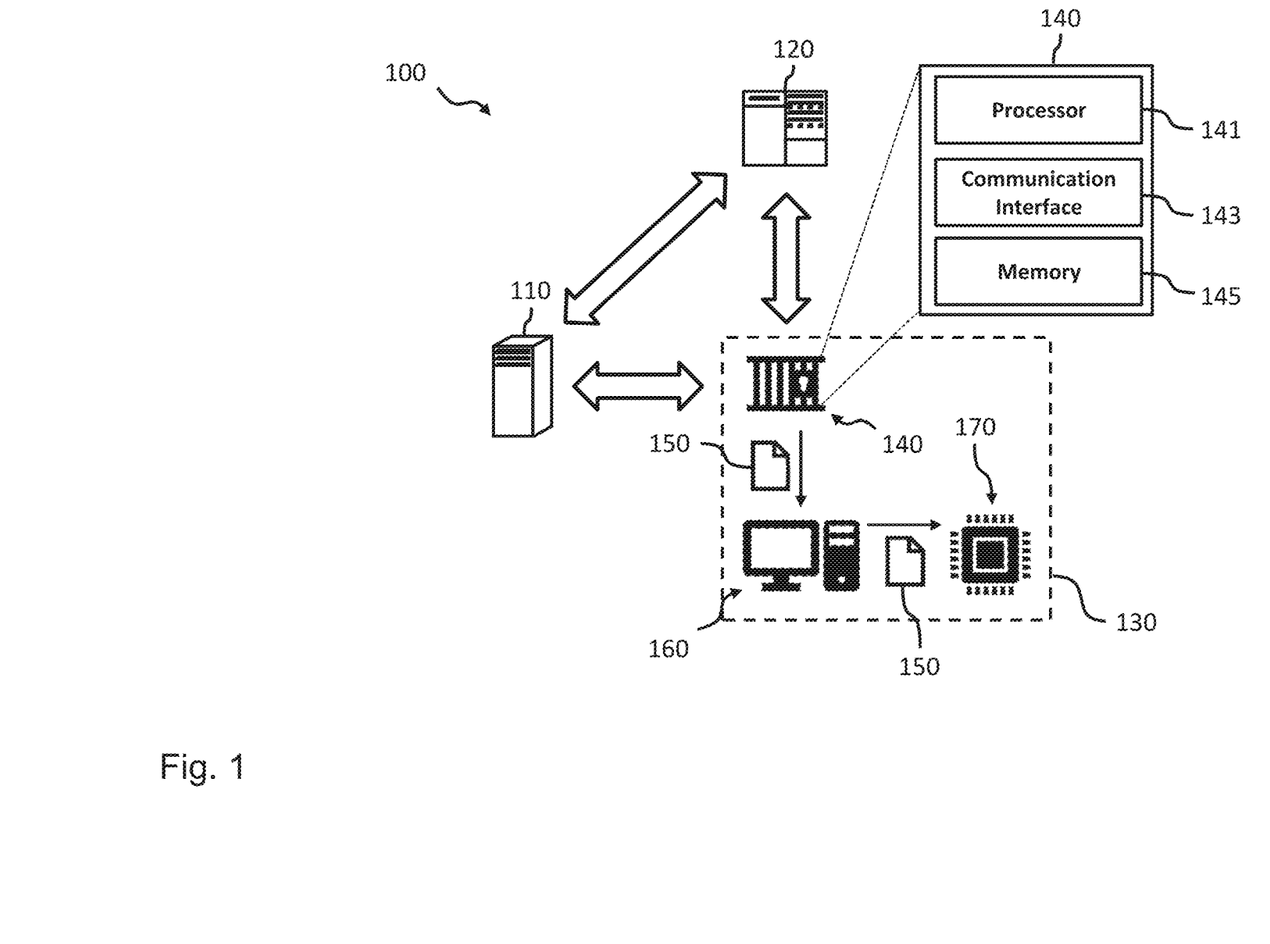
FIG. 1 shows a schematic diagram illustrating a provisioning system including a provisioning control apparatus according to an embodiment of the invention.

FIG. 1 shows a schematic diagram of a provisioning system 100 according to an embodiment of the invention, including a provisioning control apparatus 140 according to an embodiment of the invention. As will be described in more detail further below, the provisioning system 100 may comprise in addition to the provisioning control apparatus 140 a remote server 110, a security server 120 and a provisioning equipment server 160 for provisioning or personalizing electronic devices or components 170, such as chips or microprocessors 170 with security sensitive provisioning data 150, such as electronic keys, certificates and/or configuration data. As illustrated in FIG. 1, the provisioning control apparatus 140, the remote server 110 and the security server 120 may be configured to communicate with each other via a communication network, such as the Internet. Thus, the provisioning control apparatus 140, the remote server 110 and the security server 120 may be at different locations and under the control of different parties. As illustrated in FIG. 1, the provisioning control apparatus 140 and the provisioning equipment server 160 may be located within a production environment 130, such as a personalization factory 130. In an embodiment, the remote server 110 may be under the control or associated with an electronic equipment manufacturer, e.g. an OEM, wherein the electronic equipment manufacturer assembles electronic equipment, such as smartphones, tablet computers or other types of IoT or electronic consumer equipment, using the electronic devices or components 170 provisioned by the provisioning equipment server 160 with the security sensitive provisioning data 150. In an embodiment, at least a portion of the security sensitive provisioning data 150 may be a firmware of the electronic equipment manufacturer associated with the remote server 110.

In an embodiment, the provisioning control apparatus 140, the remote server 110 and the security server 120 are configured to securely communicate with each other using one or more cryptographic schemes, such as a public key infrastructure and/or a hybrid cryptographic scheme. In an embodiment, the provisioning control apparatus 140 may be under the remote control of the security server 120.

The provisioning control apparatus 140 is configured to be coupled to the provisioning equipment server 160, for instance, by a wired or a wireless connection. In an embodiment, the provisioning equipment server 160 may be implemented as a personal computer and the provisioning control apparatus 140 may be implemented as a PC card inserted in the provisioning equipment server 160. The provisioning equipment server 160 may comprise an electrical and/or mechanical interface for interacting directly or indirectly via a provisioning equipment with the electronic devices or components 170. For instance, the provisioning equipment server 160 may comprise a personalization tray for personalizing a batch of electronic devices or components 170 inserted therein.

Figure 2A:
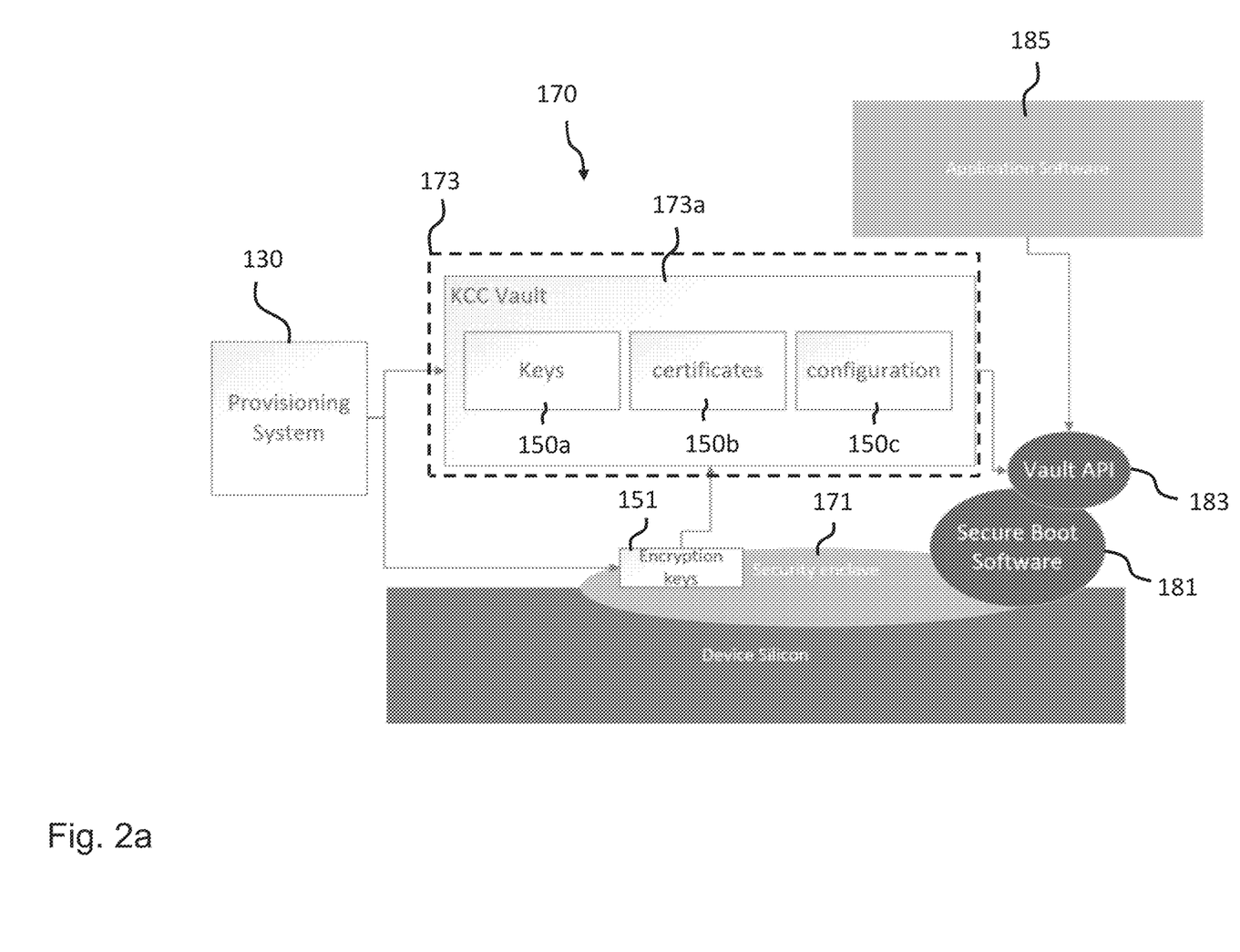
FIG. 2a shows a schematic diagram illustrating in more detail an exemplary architecture of an electronic component provisioned by a provisioning control apparatus according to an embodiment.
Figure 2B:
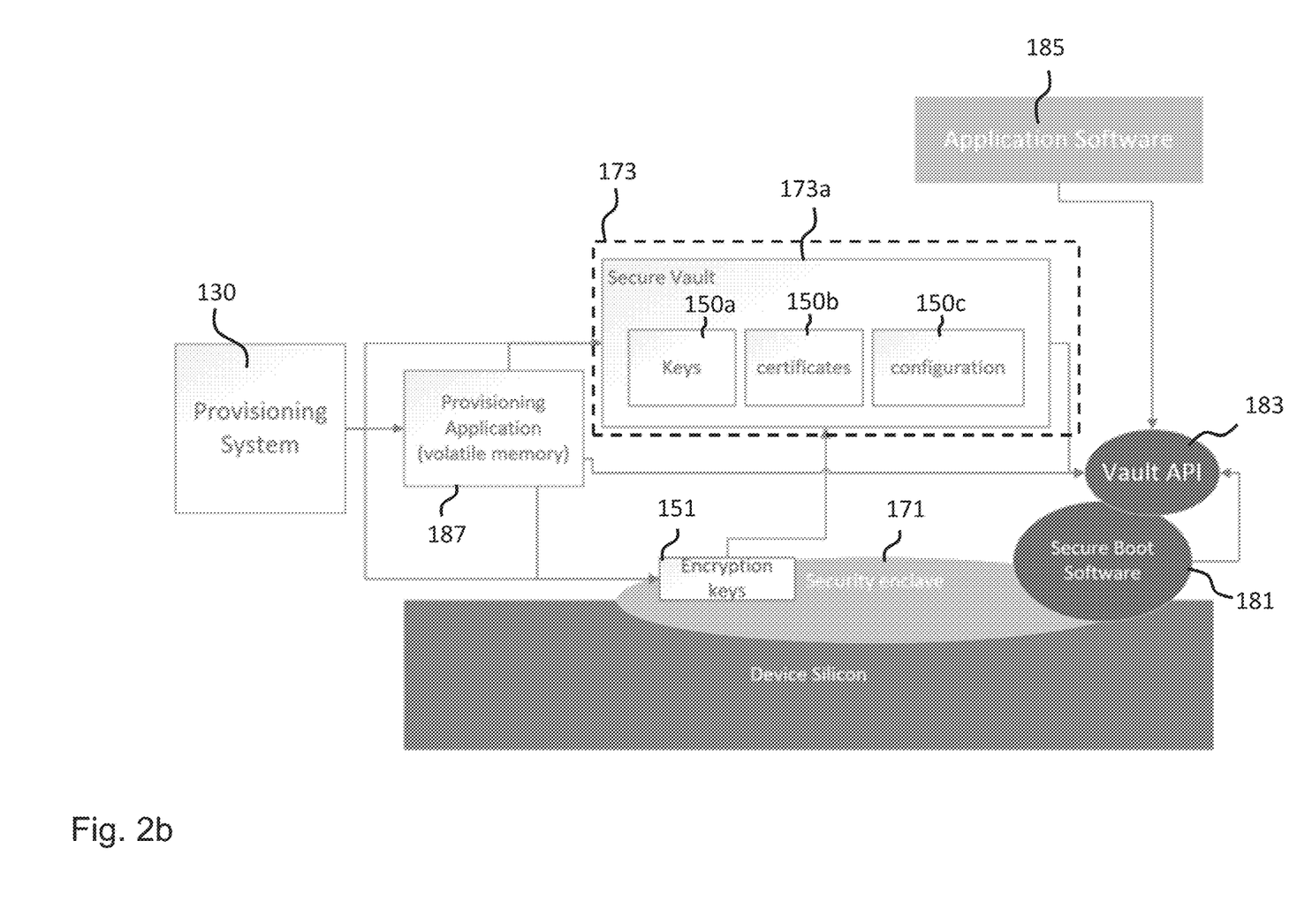
FIG. 2b shows a schematic diagram illustrating in more detail an exemplary architecture of an electronic component provisioned by a provisioning control apparatus according to a further embodiment.

In the embodiment illustrated in FIG. 1 the provisioning control apparatus 140 comprises a processor 141, a communication interface 143 and a non-transient memory 145. As will be described in more detail in the following under further reference to FIGS. 2a and 2b, the processor 141 of the provisioning control apparatus 140 is configured to encrypt the security sensitive provisioning data 150 using a secure vault encryption key 151 for obtaining encrypted security sensitive provisioning data 150. Moreover, the communication interface 143 of the provisioning control apparatus 140 is configured to securely provide the secure vault encryption key 151 to the provisioning equipment server 160 for storing the secure vault encryption key 151 in a hardware security enclave 171 of the electronic component 170, as illustrated in FIGS. 2a and 2b. The hardware security enclave 171 of the electronic component 170 may comprise or be similar to the security enclave processor as disclosed in U.S. Pat. No. 8,832,465, which is herein fully incorporated by reference.

The communication interface 143 of the provisioning control apparatus 140 is further configured to provide the encrypted security sensitive provisioning data 150 to the provisioning equipment server 160 for storing the encrypted security sensitive provisioning data 150 in a non-volatile memory, e.g. a Flash memory 173 of the electronic component 170 and thereby creating a secure vault 173a in the non-volatile memory 173 of the electronic component 170 for securely storing the security sensitive provisioning data 150. In the embodiments illustrated in FIGS. 2a and 2b, the security sensitive provisioning data 150 comprises one or more electronic keys 150a, one or more certificates 150b and configuration data 150c, i.e. data defining one or more security configurations of the electronic component 170, in particular register settings, which are encrypted by the secure vault encryption key 151 stored in the hardware security enclave 171 of the electronic component 170.

In an embodiment, the processor 141 of the provisioning control apparatus 140 is further configured to generate the secure vault encryption key 151, for instance, using a key generation mechanism. In an embodiment, the secure vault encryption key 151 is a symmetric key.

In an embodiment, the security sensitive provisioning data 150 stored in the non-volatile memory 173 of the electronic component 170 may not comprise the key certificates 150b themselves, but the hash values thereof. In such an embodiment, the one or more key certificates may be stored in plaintext in a less secure portion of the non-volatile memory 173 of the electronic component 170. In another embodiment, an application software 185 (as illustrated in FIGS. 2a and 2b) running on the provisioned electronic component 170 may receive the one or more key certificates over a communication link from a certificate store and compare the respective hash values stored within the non-volatile memory 173 of the electronic component 170.

In an embodiment, the communication interface 143 of the provisioning control apparatus 140 is further configured to securely provide a secure vault authentication key to the provisioning equipment server 160 for storing the secure vault authentication key in the hardware security enclave 171 and the non-volatile memory 173 of the electronic component 170. In an embodiment, the secure vault authentication key may be used as part of a cipher suite that includes authentication, such as AES-GCM. In a further embodiment, the secure vault authentication key may be a symmetric key for a MAC, such as HMAC or CMAC, to provide an authentication function on the encrypted security sensitive provisioning data 150. In a further embodiment, the secure vault authentication key may be part of an asymmetric private/public key pair. In such an embodiment, the signature might be done either by the hardware security enclave 171 using the private key stored therein, or it might be done outside using a private key stored in the memory 145 of the provisioning control apparatus 140. In this case there might also be a certificate chain proving that the authentication is from the public key infrastructure (PM) of the remote server 110 of the OEM.

As illustrated in FIGS. 2a and 2b, in an embodiment, the communication interface 143 of the provisioning control apparatus 140 is further configured to provide a secure vault API 183 to the provisioning equipment server 160 for storing the program code of the secure vault API 183 in the non-volatile memory 173 of the electronic component 170, wherein the secure vault API 183 is configured to decrypt the encrypted security sensitive provisioning data 150 stored in the secure vault 173a based on the secure vault encryption key 151 stored in the hardware security enclave 171, i.e. for providing access to the secure vault 173a. As illustrated in FIGS. 2a and 2b, the secure vault API 183 may be executed by a secure boot software 181.

As illustrated in the embodiment shown in FIG. 2b, the communication interface 143 of the provisioning control apparatus 140 may be further configured to provide a provisioning application 187 to the provisioning equipment server 160 for storing the provisioning application 187 in a volatile memory of the electronic component 170. In an embodiment, the provisioning application 187 is configured to be executed by a processor of the electronic component 170 for establishing a secure communication channel between the provisioning control apparatus 140 and the electronic component 170, wherein the communication interface 143 is configured to provide the secure vault encryption key 151 via the secure communication channel to the provisioning equipment server 160 for storing the secure vault encryption key 151 in the hardware security enclave 171 of the electronic component 170. In a further embodiment, the provisioning application 187 causes the hardware security enclave 171 to create one or more asymmetric key pairs, with the private key inside the security enclave 171, and the public key is extracted and returned to the provisioning control apparatus 140, which uses it to create an additional certificate and to encrypt the keys, certificates and other data for the specific secure vault 173a, returned along the communication interface 143 to be installed by the provisioning application 187 into the electronic component 170.

Figure 3:
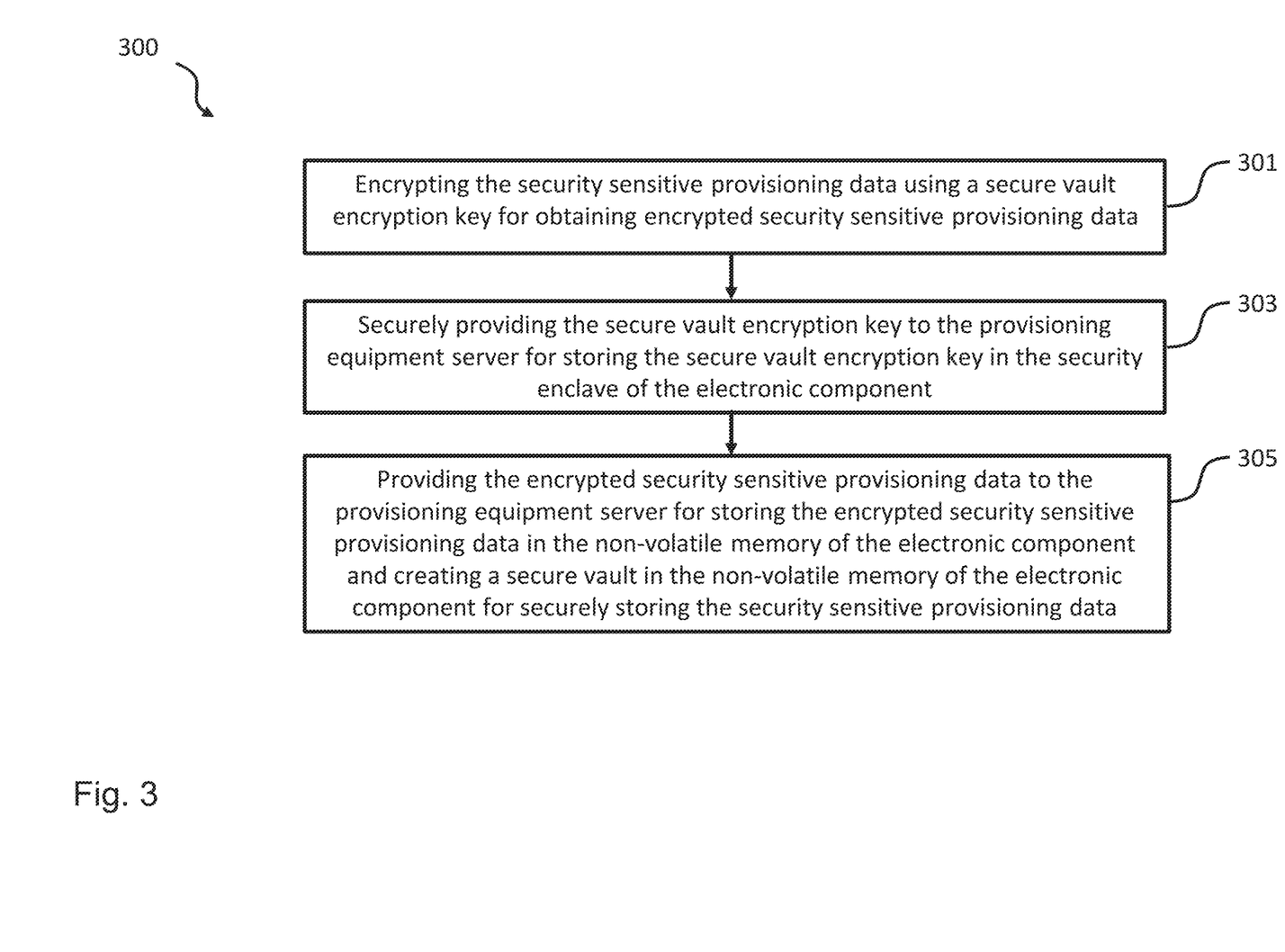
FIG. 3 shows a flow diagram illustrating steps of a provisioning method according to an embodiment of the invention.

FIG. 3 shows a flow diagram illustrating steps of a provisioning method 300 according to an embodiment of the invention for provisioning the one or more electronic components or devices 170 with security sensitive provisioning data 150 by the provisioning control apparatus 140 configured to be coupled to the provisioning equipment server 160. The provisioning equipment server 160 is electrically connectable with the one or more electronic components 170, wherein each electronic component 170 comprises a hardware security enclave 171 and a non-volatile memory 173. The provisioning method 300 comprises the steps of:

encrypting 301 the security sensitive provisioning data 150 using the secure vault encryption key 151 for obtaining encrypted security sensitive provisioning data 150;

securely providing 303 the secure vault encryption key 151 to the provisioning equipment server 160 for storing the secure vault encryption key 151 in the security enclave 171 of the electronic component 170; and providing 305 the encrypted security sensitive provisioning data 150 to the provisioning equipment server 160 for storing the encrypted security sensitive provisioning data 150 in the non-volatile memory 173 of the electronic component 170 and thereby creating a secure vault 173a in the non-volatile memory 173 of the electronic component 170 for securely storing the encrypted security sensitive provisioning data 150.

Advantageously, embodiments disclosed herein enable electronic devices or components 170 with a limited hardware security enclave 171 to be used with the same model of key storage, and may hold keys of types that the security enclave 171 is unaware of, as well as significantly more keys than the enclave 171 could hold. An application software 185 written for the vault API 183 can be easily transferred to a different type of electronic device or component 170, and will benefit from the best security that its security enclave 171 can provide, but will be able to use multiple keys of any types it requires, despite the underlying hardware not being capable of providing that API. According to further embodiments disclosed herein the security vault 173a may be easily upgraded to use newer stronger keys when such systems become available, keeping the overall product as secure as state-of-the-art security permits. This means that cheaper electronic components may be used for products without having to forfeit security.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application.

Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g.," are merely meant as an example, rather than the best or optimal. The terms "coupled" and "connected", along with derivatives may have been used. It should be understood that these terms may have been used to indicate that two elements cooperate or interact with each other regardless of whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

The invention claimed is:

1. A provisioning control apparatus configured to be coupled to a provisioning equipment server, wherein the provisioning equipment server is electrically connectable with one or more electronic components for provisioning the one or more electronic components with security sensitive provisioning data, each of the one or more electronic components comprising a security enclave and a non-volatile memory, wherein the provisioning control apparatus comprises: a processor configured to encrypt the security sensitive provisioning data using a secure vault encryption key for obtaining encrypted security sensitive provisioning data; and a communication interface configured to securely provide the secure vault encryption key to the provisioning equipment server for storing the secure vault encryption key in the security enclave of the electronic component, wherein the communication interface is further configured to provide the encrypted security sensitive provisioning data to the provisioning equipment server for storing the encrypted security sensitive provisioning data in the non-volatile memory of the electronic component and thereby creating a secure vault in the non-volatile memory of the electronic component for securely storing the encrypted security sensitive provisioning data, wherein the secure vault is unique for the electronic component, wherein the communication interface is further configured to provide a secure vault Application Programming Interface (API) to the provisioning equipment server for storing a program code of the secure vault Application Programming Interface (API) in the non-volatile memory of the electronic component, wherein the secure vault Application Programming Interface (API) is configured to decrypt the encrypted provisioning data stored in the secure vault based on the secure vault encryption key stored in the security enclave for providing access to the secure vault, wherein the secure vault Application Programming Interface (API) is executed by a secure boot software of the electronic component.

2. The provisioning control apparatus of claim 1, wherein the processor is further configured to generate the secure vault encryption key.

3. The provisioning control apparatus of claim 1, wherein the security sensitive provisioning data comprises one or more cryptographic keys, one or more key certificates and/or data defining one or more security configurations of the electronic component.

4. The provisioning control apparatus of claim 1, wherein the security sensitive provisioning data comprises one or more hash values of one or more key certificates.

5. The provisioning control apparatus of claim 1, wherein the non-volatile memory of the electronic component is a Flash memory of the electronic component.

6. The provisioning control apparatus of claim 1, wherein the secure vault encryption key is a symmetric key.

7. The provisioning control apparatus of claim 1, wherein the communication interface is further configured to securely provide a secure vault authentication key to the provisioning equipment server for storing the secure vault authentication key in the security enclave and the non-volatile memory of the electronic component.

8. The provisioning control apparatus of claim 1, wherein the communication interface is further configured to provide a provisioning application to the provisioning equipment server for executing the provisioning application by the electronic component, wherein the provisioning application is configured to be executed by a processor of the electronic component for establishing a secure communication channel between the provisioning control apparatus and the electronic component and wherein the communication interface is configured to provide the secure vault encryption key via the secure communication channel to the provisioning equipment server for storing the secure vault encryption key in the security enclave of the electronic component.

9. The provisioning control apparatus of claim 1, wherein the communication interface is further configured to provide a provisioning application to the provisioning equipment server for executing the provisioning application by the electronic component, wherein the provisioning application is configured to cause the security enclave to create at least one key pair, including a private key and a public key, and to store the private key in the security enclave.

10. The provisioning control apparatus of claim 9, wherein the communication interface is configured to receive the public key of the security enclave and wherein the processing circuitry is configured to encrypt at least a portion of the security sensitive provisioning data with the public key of the security enclave, wherein the communication interface is further configured to provide the security sensitive provisioning data encrypted with the public key of the security enclave to the provisioning equipment server for storing the security sensitive provisioning data encrypted with the public key of the security enclave in the secure vault in the non-volatile memory of the electronic component.

11. A provisioning system, comprising:
a provisioning control apparatus according to claim 1; and
a provisioning equipment server.

12. A method for provisioning one or more electronic components with security sensitive provisioning data by a provisioning control apparatus configured to be coupled to a provisioning equipment server, wherein the provisioning equipment server is electrically connectable with the one or more electronic components, each of the one or more electronic components comprising a security enclave and a non-volatile memory, wherein the method comprises: encrypting the security sensitive provisioning data using a secure vault encryption key for obtaining encrypted security sensitive provisioning data; securely providing the secure vault encryption key to the provisioning equipment server for storing the secure vault encryption key in the security enclave of the electronic component; and providing the encrypted security sensitive provisioning data to the provisioning equipment server for storing the encrypted security sensitive provisioning data in the non-volatile memory of the electronic component and thereby creating a secure vault in the non-volatile memory of the electronic component for securely storing the encrypted security sensitive provisioning data, wherein the secure vault is unique for the electronic component, wherein the communication interface is further configured to provide a secure vault Application Programming Interface (API) to the provisioning equipment server for storing a program code of the secure vault Application Programming Interface (API) in the non-volatile memory of the electronic component, wherein the secure vault Application Programming Interface (API) is configured to decrypt the encrypted provisioning data stored in the secure vault based on the secure vault encryption key stored in the security enclave for providing access to the secure vault, wherein the secure vault Application Programming Interface (API) is executed by a secure boot software of the electronic component.

* * * * *